July 13, 1937.  P. W. ROM  2,086,959
VEHICLE SIGNALING SYSTEM
Filed Jan. 25, 1933  2 Sheets-Sheet 1
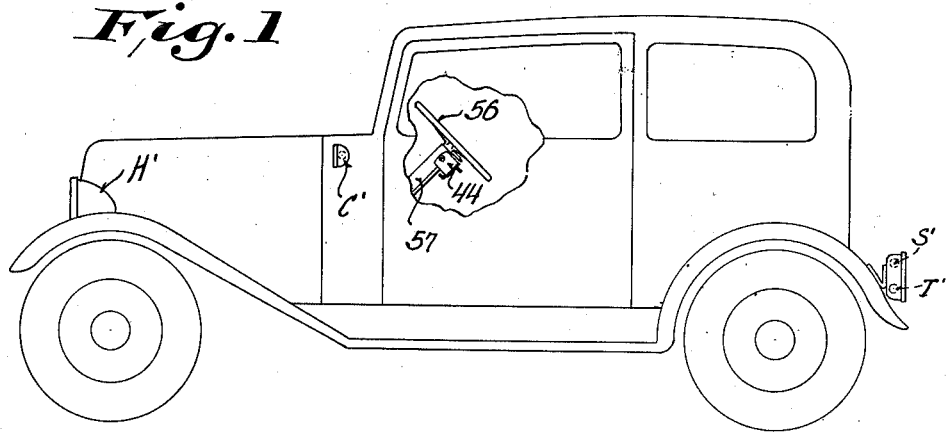
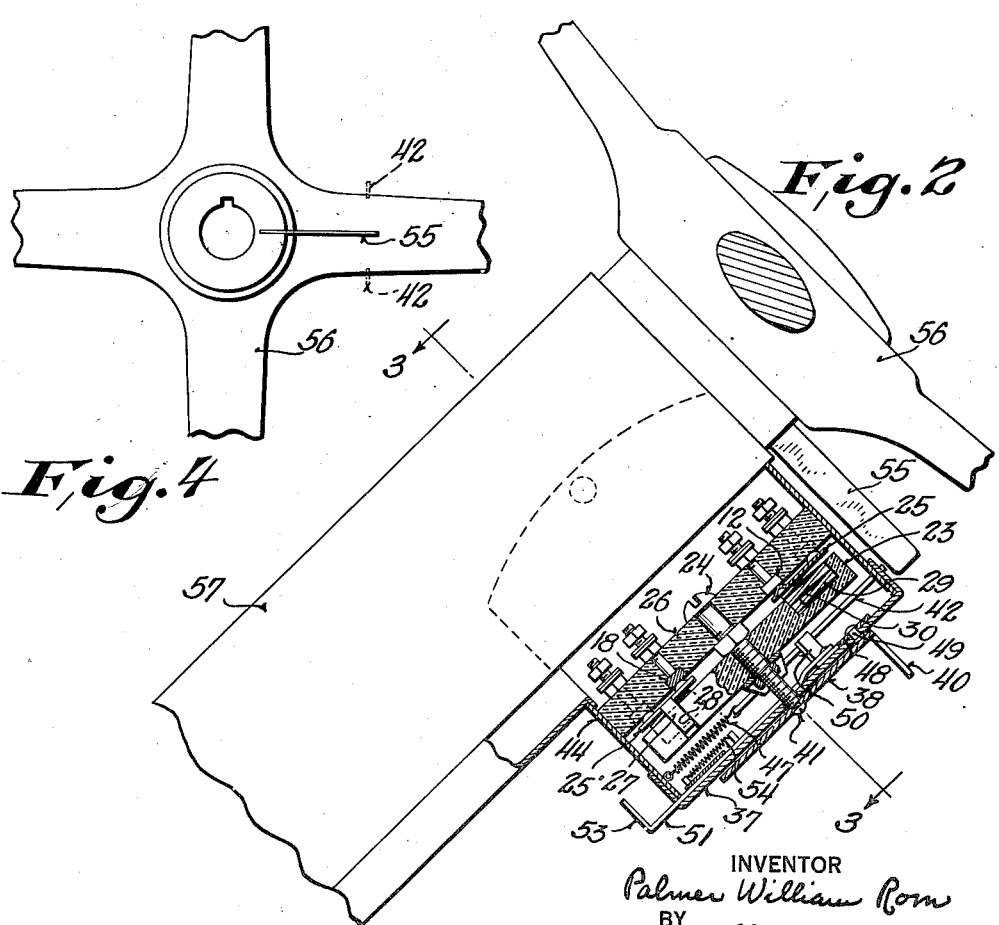
INVENTOR
Palmer William Rom
BY Louis O. French
ATTORNEY

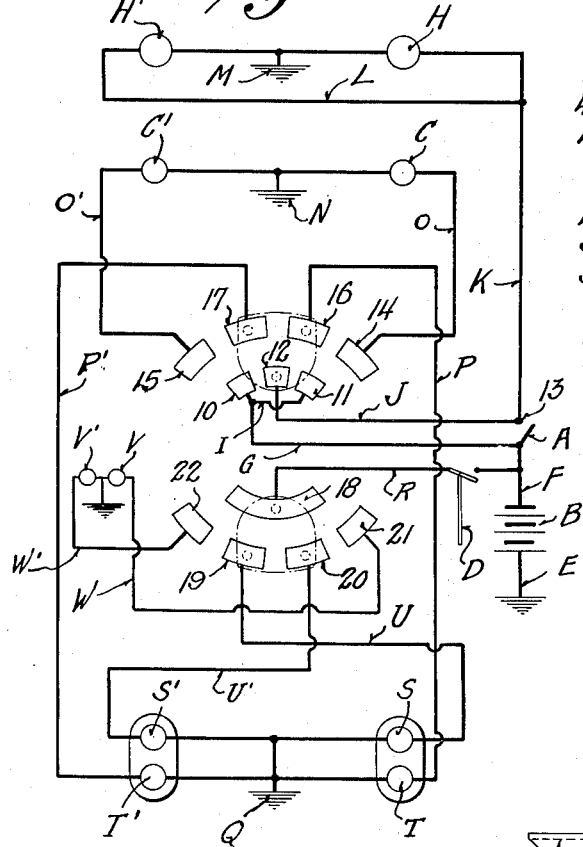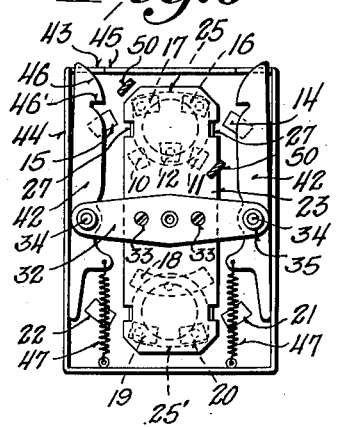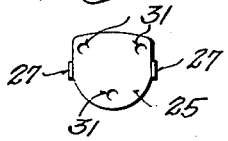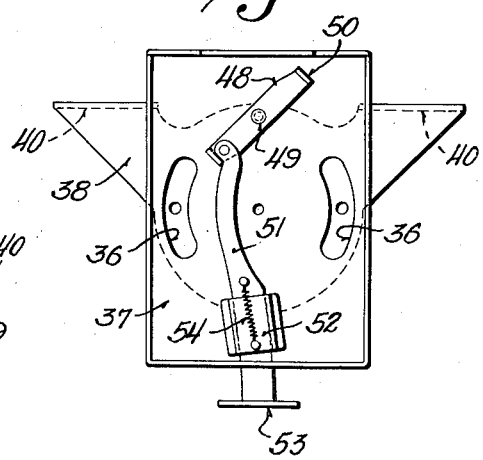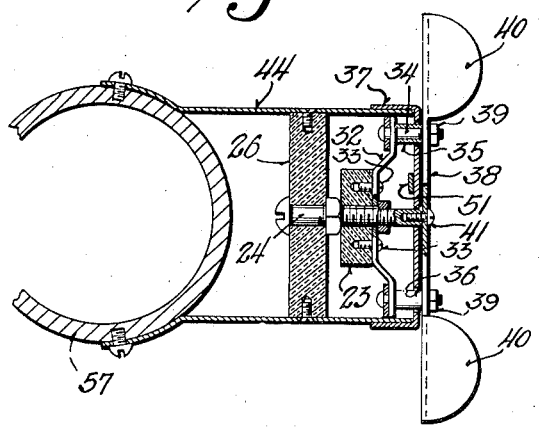

Patented July 13, 1937

2,086,959

UNITED STATES PATENT OFFICE 2,086,959

VEHICLE SIGNALING SYSTEM

Palmer William Rom, Cudahy, Wis., assignor of forty-nine per cent to Harry W. Burmeister, Milwaukee, Wis.

Application January 25, 1933, Serial No. 653,425

5 Claims. (Cl. 177—337)

The invention relates to vehicle signaling systems.

One of the objects of the invention is to provide direction indicator signals and a control switch therefor under the control of the operator so as to indicate the direction of turning and under the control of a part of the steering mechanism of the vehicle to bring the control switch to the "off" position before the turn of the vehicle is completed.

A further object of the invention is to associate the direction indicator signal with the usual headlights and headlight switch without any change in the same and also permit the use of the usual brake operated stoplight switch in conjunction with a pair of taillights that are also controlled by the direction indicator control switch.

The invention further consists in the several features hereinafter set forth and more particularly defined by claims at the conclusion hereof.

In the drawings:

Fig. 1 is a view of a motor vehicle equipped with a signaling system embodying the invention, parts of the vehicle being broken away;

Fig. 2 is a vertical sectional view through the control switch mechanism forming a part of the system.

Fig. 3 is a detail sectional view taken on the line 3—3 of Fig. 2;

Fig. 4 is a detail bottom plan view of the steering wheel, parts being broken away;

Fig. 5 is a wiring diagram of the system;

Fig. 6 is a view of the control switch, the cover being removed;

Fig. 7 is a detail plan view of one of the switch contacts;

Fig. 8 is a detail rear elevation view of the cover and associated parts.

Referring to Fig. 5, H and H' designate the headlights, C and C' the cowl or fender lights, S and S' the stop lights and T and T' the taillights, these lights being arranged in pairs and the lights of each pair being located at opposite sides of the vehicle and A designates the usual headlight switch, B the battery and D the usual stoplight switch, which is generally connected for actuation by the brake pedal.

One side of the battery B is grounded at E and the other side is connected by a conductor F to the switch A and to a conductor G connected to a fixed contact 10 and to a conductor I connected to a fixed contact 11. A contact 12 disposed between contacts 10 and 11 is connected by a conductor J to a terminal post 13 from which conductor K extends to one side of the headlight H while a conductor L extends from the conductor K to one side of the headlight H'. The other sides of the lights H and H' are connected to a common ground at M. One side of the cowl lights C and C' is connected to a common ground N. The other side of the light C is connected by a conductor O to a fixed contact 14 while the other side of the light C' is connected by a conductor O' to a fixed contact 15. Spaced contacts 16 and 17 are respectively connected by conductors P and P' to one of the sides of the taillights T and T' whose other sides are connected to the common ground Q.

The switch D bridges parts of a conductor R connected to conductor F and to a fixed contact 18. Spaced contacts 19 and 20 are respectively connected by conductors U and U' to one of the sides of the stoplights S and S' whose other sides are connected to the ground Q. Test lights V and V' have one of their sides connected to a common ground while their other sides are respectively connected by conductors W and W' to fixed contacts 21 and 22.

The contacts 15, 17, 16 and 14 are radially arranged and the contacts 10, 12 and 11 similarly arranged on a smaller radius. Similarly the contacts 22, 19, 20 and 21 are disposed on a common radius and the contact 18 arranged at a less radial distance from the center of this radius. A control switch arm 23 of suitable insulating material is pivotally mounted on a pin 24 which is at the center of the arcs of movement of bridging contacts 25 and 25' cooperating respectively with the contacts 10, 12, 11, 14 to 17 inclusive and contacts 18 to 22 inclusive.

The pin 24 is in the form of a screw bolt clamped to a base block 26 of insulating material in which the fixed contacts previously referred to are inset and the bridging contacts 25 and 25' are each provided with guide legs 27 slidably mounted in grooves 28 in said arm and are each yieldingly urged against their cooperative fixed contacts by a spring 29 mounted in a recess 30 in said arm. Each of the contacts 25 and 25' has three projections 31 spaced so as to bridge three of the fixed contacts at one setting of the switch arm.

For turning the switch arm 23, an arm 32 is secured by screws 33 to said arm 23 and carries screws 34 associated with sleeves 35 projecting out through arcuate slots 36 in the casing cover 37 and to which sleeves and screws a hand plate 38 is secured by the nuts 39, said plate having oppositely disposed ears 40 for engagement by the finger of the operator. The plate 38 may also be operatively connected to the pin 24 by the screw 41. Thus by turning the plate 38 about the pin 24 the switch arm 23 is likewise turned.

Means are provided for holding the switch arm 23 in the position to which it has been shifted for indicating a turn comprising a pair of latches 42 pivotally mounted on pivots provided by the screws 34, each latch working in a recess 43 in the switch casing 44 and adapted to engage the part 45 of said casing adjacent said recess, the head of each latch having a curved side 46 acting as a cam in conjunction with the bottom of the recess 43 to automatically move the latch outwardly during its upward movement and then permit its automatic engagement with the casing at which time the shoulder 46' of the latch, so moved, engages over the adjacent part 45 of the casing. Each latch 42 has a spring 47 connected to it below and at one side of its pivot which tends to move said latch toward a locking position and since the springs are mounted on the opposite sides of the arm 32 they act to hold the switch arm 23 in normal position and to return it to such position when either of the latches is released. Thus when the switch arm 23 is turned clockwise as viewed in Fig. 6, the latch 42 at the left hand side will be moved upwardly into locking engagement with the casing and turning said arm in the opposite direction brings the right hand latch 42 into holding engagement with the casing. If then under these conditions the holding latch is tripped, the switch arm will then be moved by the springs 47 back to normal non-indicating position.

I have in the present instance provided a manually operated latch trip and also a latch trip controlled by a part of the steering mechanism of the vehicle. The manually operated trip comprises a trip lever 48 pivoted intermediate its ends on a pin 49 mounted on the cover adjacent the upper ends of the latches, said lever being of sheet metal having flanged ends 50 engageable with said latches. The lever 48 is moved to tripping position by a bar 51 pivotally connected at one end to said lever and guided in a guide clip 52 and provided with a head 53, said lever 48 being normally held in an inoperative position by a spring 54 connected to the bar 51 and to the cover 37.

The tripping means controlled by the steering mechanism is here shown as a stop member 55 mounted on the steering wheel 56 and preferably in the form of a spring bar, the casing 44 being mounted on the steering column 57 in such a position as to allow the member 55 to come into contact with either of the latches 42 when either of them is in an engaged position and act thereon to release the latch then engaged so that the switch will be returned to normal position. As this releasing action occurs on the turning of the steering wheel 56 as the operator is making the turn, the control switch mechanism will be released and moved to "off" position before the turn is completed.

With the above construction when the switch A is open no current will flow to the conductors K and J and consequently the headlights will be out and the center contact 12 will not be energized so that no current will flow to either of the conductors P, P' of the taillight circuit with the switch arm 23 in mid position. Under these conditions the stop light switch D when operated will allow current to flow from the battery B to conductors F and R, contacts 18, 25', 20 and 19, conductors U and U' to the lights S and S' returning through Q and E to the battery. If now, as viewed in Fig. 5, the driver of the vehicle wishes to turn to the right he pushes down on the right ear 40 of the plate 38 and thus turns the switch arm 23 so as to bring the bridging contact 25 into operative contact with the fixed contacts 11, 14 and 16 and current will then flow from the battery B through conductors F, G and I to contacts 11, 25, 14 and 16. From the contact 14 the current flows through conductor O to cowl or fender light C and then through ground N, E to the battery. From the contact 16 the current flows through conductor P to the taillight T and then through Q and E to the battery. Thus the signal light C at the front and the signal light T at the rear of the vehicle on the right hand side will be lighted to indicate the driver's intentions of making a turn to the right. In Fig. 5 the projections 31 of contact 25 are shown in dotted lines to establish connection between contacts 12, 16, and 17. Also since under these conditions the bridging contact 25' connects to contacts 18 and 19 the right hand stop light S will be lighted if the switch D is then closed.

Similarly, if the driver wishes to turn to the left he pushes down on the left ear 40 of the plate 38 and thus turns the switch arm 23 so as to bring the bridging contact 25 into operative contact with the fixed contacts 10, 15 and 17 and current will then flow from the battery B through conductors F and G to contacts 10, 25, 15 and 17. From the contact 15 the current flows through conductor O' to the left hand front signal light C' and then through ground N, E to the battery. From the contact 17 the current flows through conductor P' to the taillight T' and then through Q and E to the battery. Also the bridging contact 25' will then connect contacts 18 and 20 so that light S' will then be lighted if the switch D is then closed. Thus the signal light C' at the front and the signal light T' at the rear of the vehicle on the left hand side will be lighted to indicate the driver's intentions of making a turn to the left and the operation of the switch D will not interfere with this action but merely serve to operate the left hand stop light S'.

If under the conditions of night driving, the switch A is closed the headlights will be lighted regardless of the position of the signal control switch, the current flowing from battery B through conductor F; switch A and conductors K and L respectively to said lights. Also under these conditions current will flow through conductor J to the contact 12, in the mid-position of the switch, and through bridging contact 25 and contacts 16 and 17 to conductors P and P' to the taillights T and T' so that they will be lighted. When however under these conditions the arm 23 is turned then the bridging contact 25 will move off of that contact controlling the opposite taillight to that in which the direction of the turn is being made. For example on a right hand turn, the left hand taillight T' will go out while the right light T remains lighted.

It has been previously noted that on the turning of switch arm 23 to an indicating position it will be held in that position until tripped either manually or by the stop member 55 and in either case it will then return to normal or central position which during the daytime will turn off either the right or left hand signal lights as the case may be and which during the nighttime will turn on both taillights and permit of the simultaneous operation of both stoplights on the operation of the switch D. Under the normal operation of the system the automatic release of the control switch takes place as the driver turns the wheel 56 to complete the turn he is making. Fig. 1 shows the relative positions of the signals on the vehicle and the control switch mechanism as it appears on the steering column adjacent the steering wheel.

The test lights V and V' being respectively connected to the conductors W and W' will receive current from the battery B through conductors F and R and contact 18 when the switch arm 23 is turned respectively to the right and left of its midposition and these lights are preferably mounted on the dash of the vehicle so that the operator may check the signal circuit as well as serve as a directly visible indication of the direction being indicated by the exteriorly disposed signal lights.

From the foregoing description, it will be noted that I have provided a signaling system in which signal lights at the front and rear of the vehicle are selectively operable and that stop lights at the rear of the vehicle are also selectively operable with the signal lights if the stop light switch is on when the signal lights are applied. It is also to be noted that the control switch for the signal lights is automatically held in applied position until either released directly by the operator or automatically through his actions in completing the turn of the vehicle. Furthermore no change is necessary in the usual headlight and stoplight switches when used in the above described system.

I desire it to be understood that this invention is not to be limited to any particular form or arrangement of parts except in so far as such limitations are included in the claims.

What I claim as my invention is:

1. In a vehicle signaling system, the combination of a stop light at each side of the rear portion of the vehicle to indicate retardation, a source of current for said lights, circuit connections between said source of current and said lights, a stop light switch for controlling the flow of current through said connections to both of said stop lights, and means for selectively controlling the flow of current through said connections to said stop lights, to indicate a turn and retardation, when said stop light switch is "on".

2. In a vehicle signaling system, the combination of a stop light and a tail light at each side of the vehicle at the rear thereof, a source of current for said lights, circuit connections between said source of current and both sets of lights, a control switch for the circuit connections for said stop lights, a control switch for the circuit connections for said tail lights, a direction indicating switch in the circuit connections for both sets of lights controlling said stop lights if said first named control switch is "on" to operate one of said lights and controlling said tail lights to operate the tail light on the same side as the lighted stop light whether said second named control switch is "on" or "off".

3. In a vehicle signaling system, the combination of a tail light and a stop light disposed on each side of the rear portion of the vehicle, a source of current for said lights, circuit connections between said source of current and both sets of lights, a direction control switch selectively controlling the flow of current through said circuit connections to both sets of lights, a stop light switch in the circuit connections for said stop lights and normally operable to control the flow of current through both of said stop lights, said direction control switch selectively controlling the flow of current through said stop lights when said stop light switch is "on" and also selectively controlling the flow of current through the circuit connections for said tail lights to display a tail light on the same side of the vehicle as that of the selected stop light.

4. In a vehicle signaling system, the combination of sets of signal lights, one set of said lights being two stop lights respectively disposed at each side of the rear portion of the vehicle, a source of current for said lights, circuit connections between said source of current and said sets of lights, a direction control switch selectively controlling the lights in each of said circuit connections, a stop light switch in the circuit connections for said stop lights and normally operable to control the flow of current through both of said stop lights, said direction control switch selectively controlling the flow of current through said stop lights when said stop light switch is "on" and also selectively controlling the flow of current through the circuit connections for the other signal lights.

5. In a vehicle signaling system, the combination of a pair of running lights, one at each side of the vehicle, a source of current for said lights, a switch mechanism having parallel connections to said source of current and a separate connection to each running light, one of said parallel connections being connectible through said switch simultaneously with the separate connection to each light and having a control switch therein for controlling the flow of current to said lights, the other of said parallel connections being selectively connectible through said switch mechanism with either of said separate connections to indicate a turn whether said control switch is "off" or "on".

PALMER WILLIAM ROM.